(No Model.)
7 Sheets—Sheet 1.
E. GESSNER.
FEEDING MECHANISM FOR CARDING MACHINES.
No. 267,513. Patented Nov. 14, 1882.
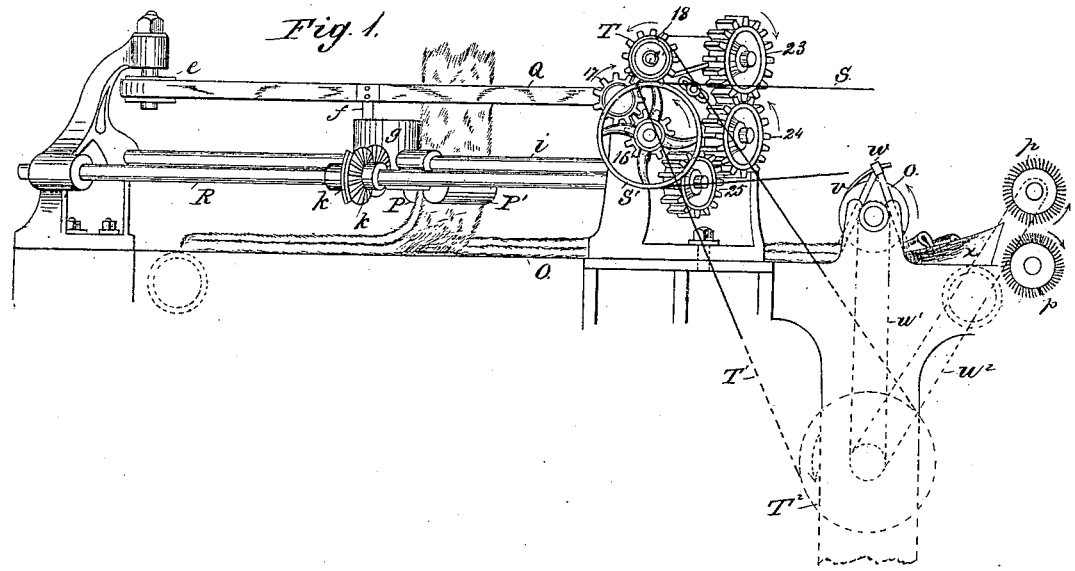
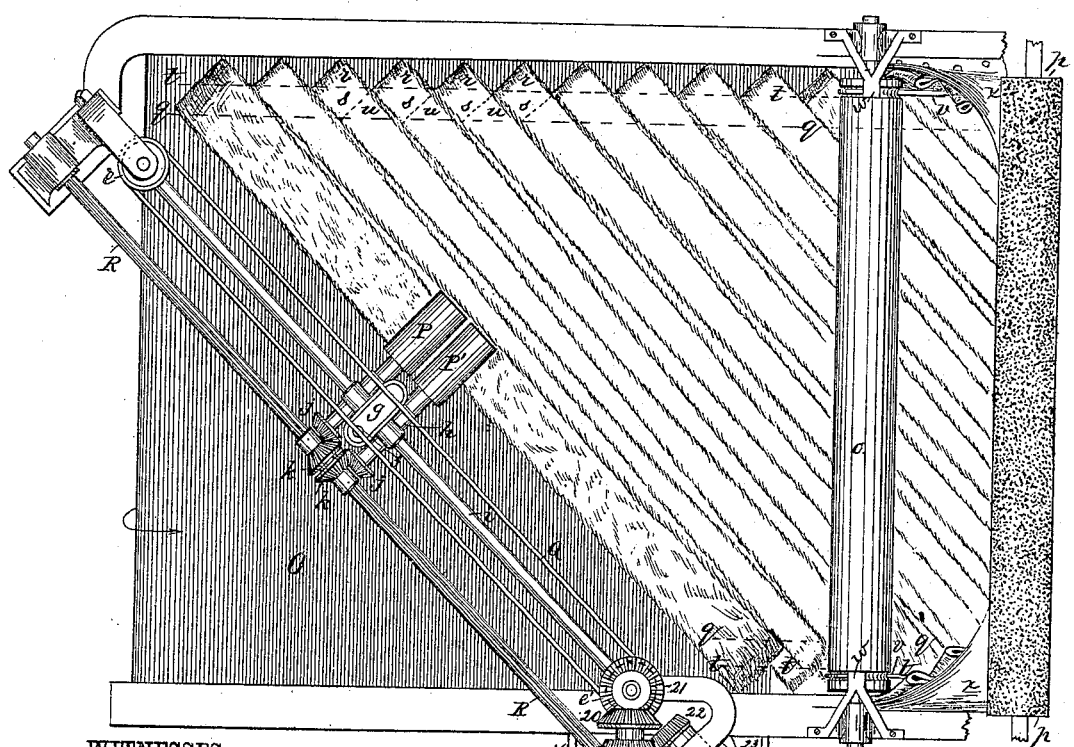
WITNESSES:
W. W. Hollingsworth
Edw. U. Byrn
INVENTOR:
E. Gessner
BY
ATTORNEYS.

(No Model.)
E. GESSNER.
FEEDING MECHANISM FOR CARDING MACHINES.
No. 267,513. Patented Nov. 14, 1882.
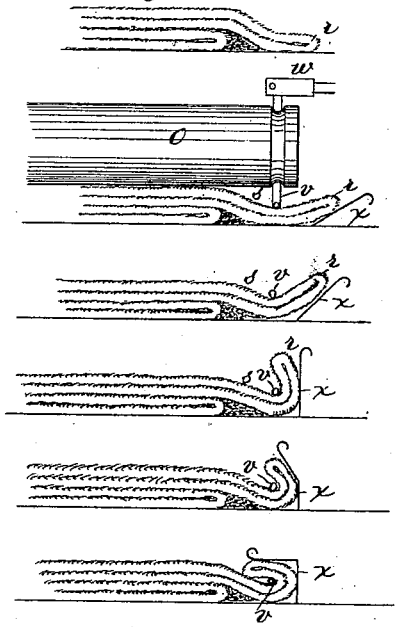
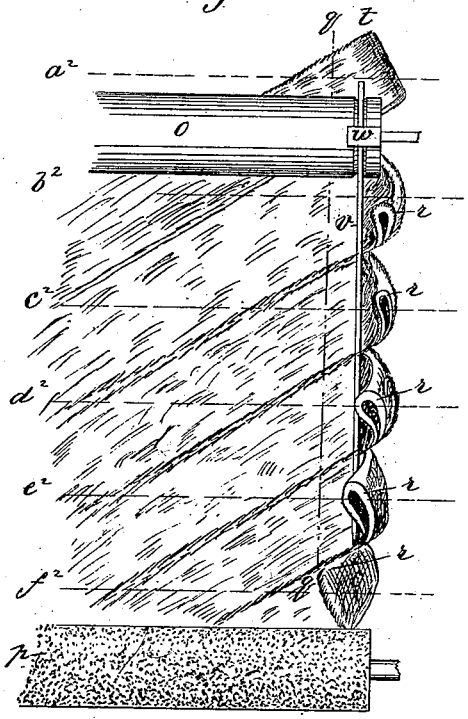
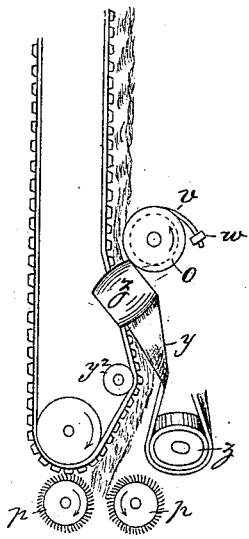
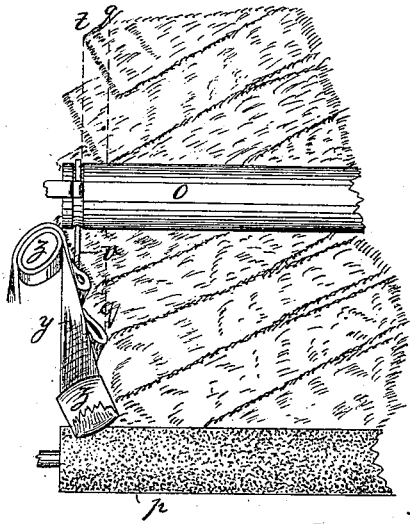
WITNESSES:
W. W. Hollingworth
Edw. W. Byrn.
INVENTOR:
E. Gessner
BY
ATTORNEYS.

(No Model.) 7 Sheets—Sheet 3.
E. GESSNER.
FEEDING MECHANISM FOR CARDING MACHINES.
No. 267,513. Patented Nov. 14, 1882.
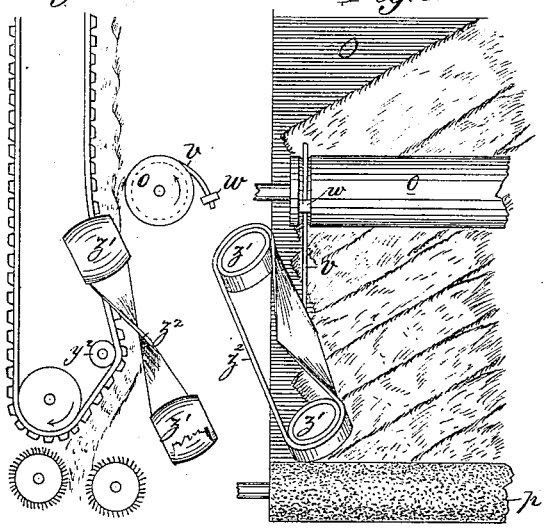
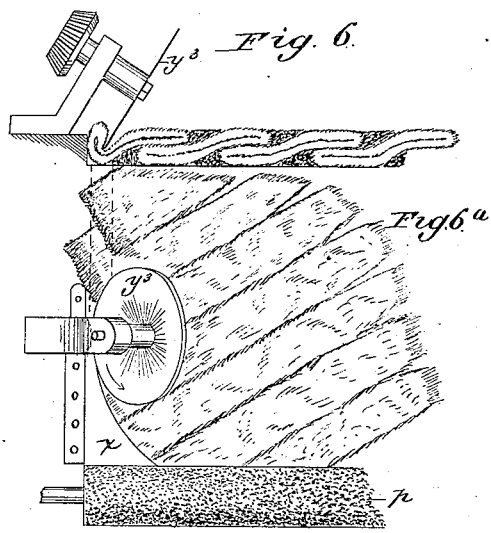
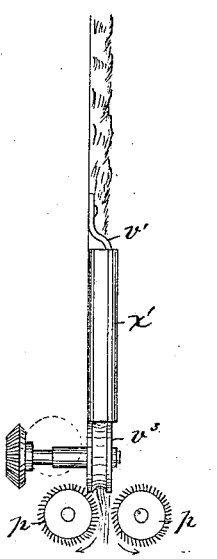
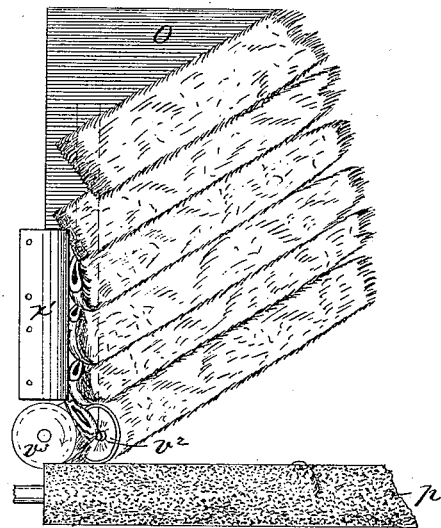
WITNESSES:
W. W. Hollingworth
Edw. W. Byrn
INVENTOR:
E. Gessner
BY
ATTORNEYS.

(No Model.)  7 Sheets—Sheet 4.
E. GESSNER.
FEEDING MECHANISM FOR CARDING MACHINES.
No. 267,513.  Patented Nov. 14, 1882.
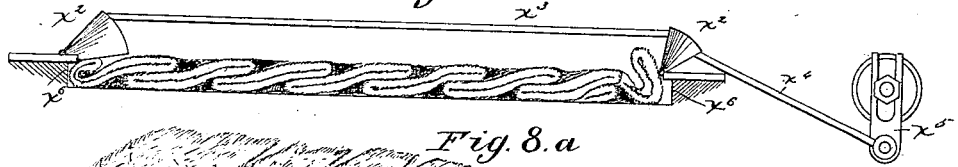
Fig. 8.
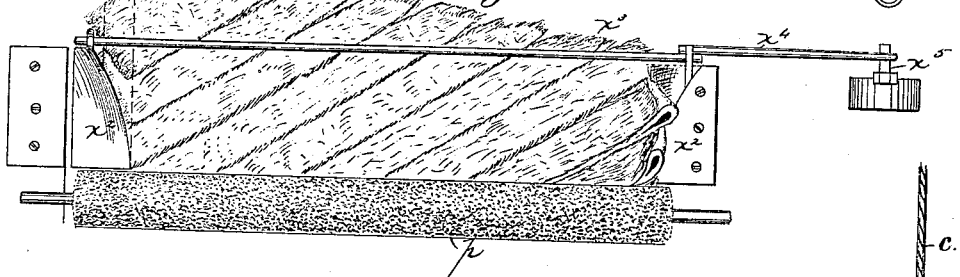
Fig. 8.a
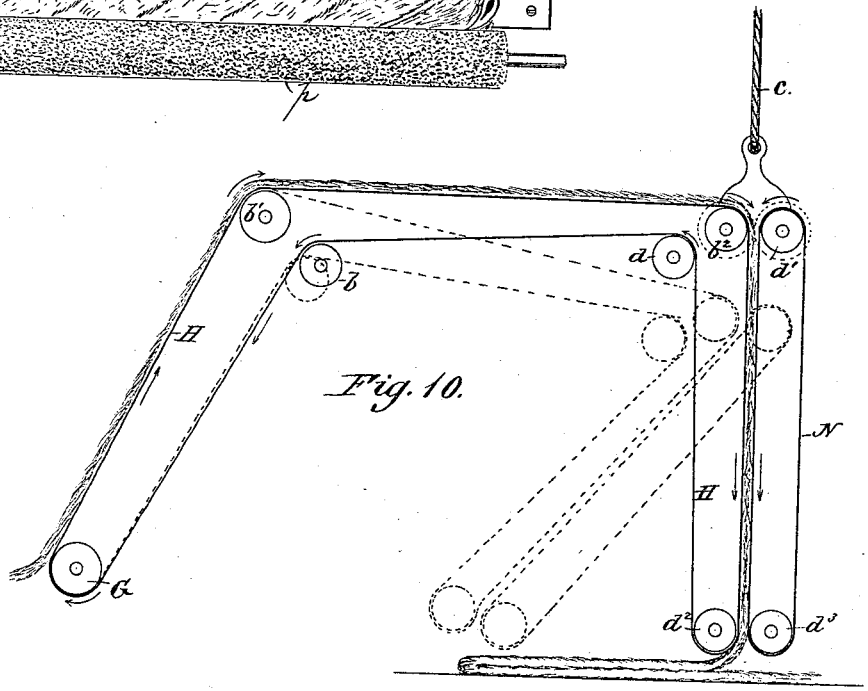
Fig. 10.
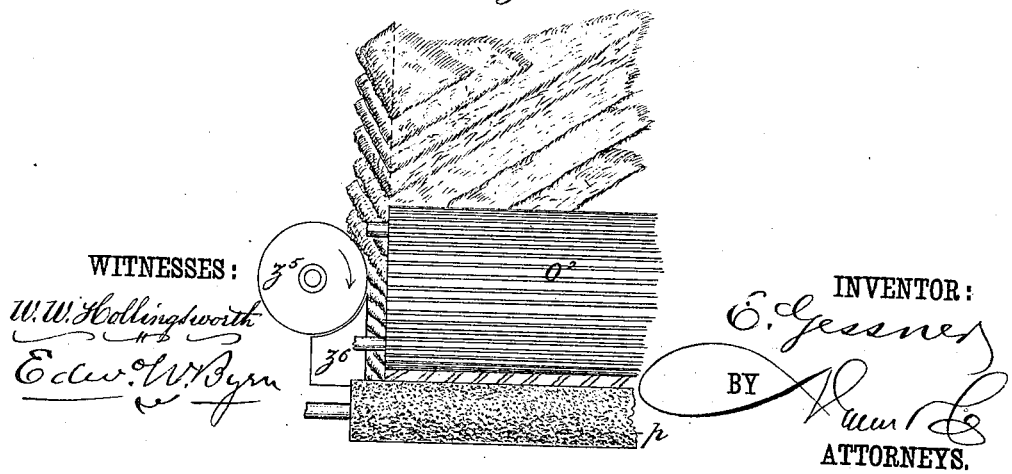
Fig. 9.
WITNESSES:
W. W. Hollingsworth
Edw. W. Byrn
INVENTOR:
E. Gessner
BY
ATTORNEYS.

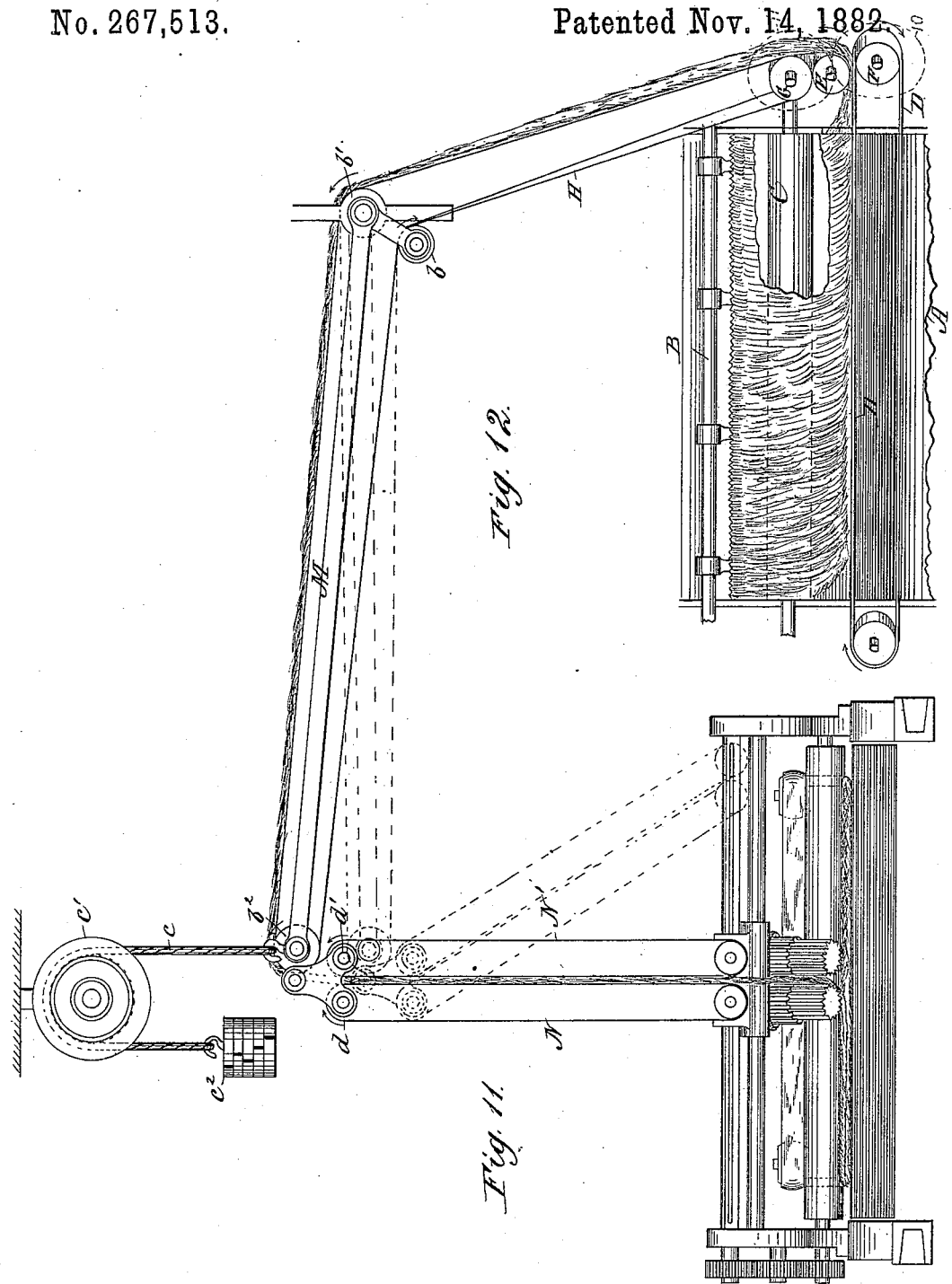

(No Model.)
7 Sheets—Sheet 6.
E. GESSNER.
FEEDING MECHANISM FOR CARDING MACHINES.
No. 267,513.
Patented Nov. 14, 1882.
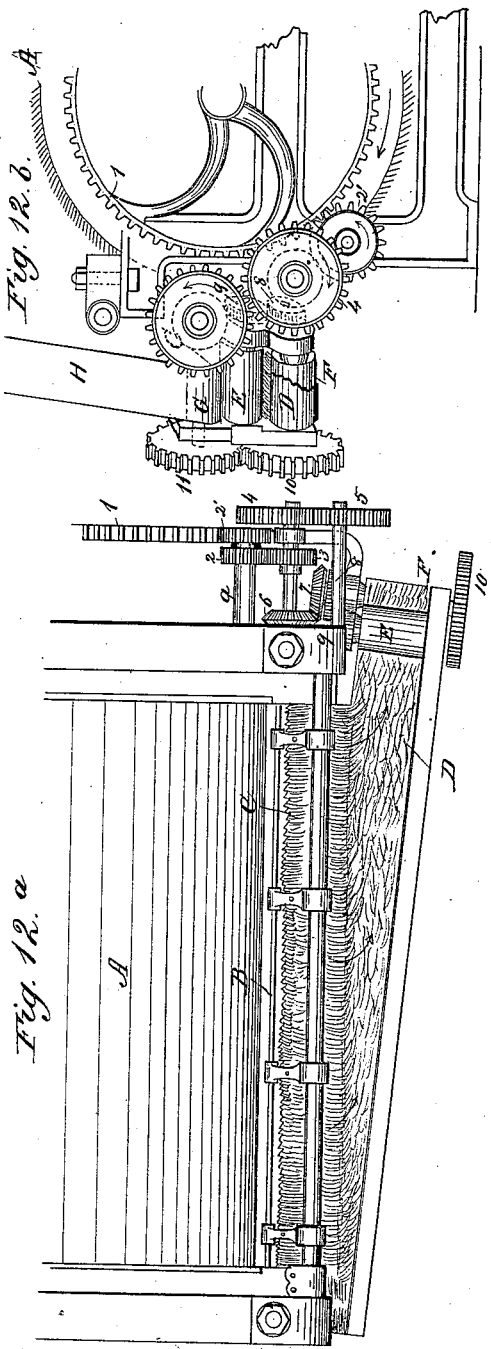
WITNESSES:
W. W. Hollingworth
Edw. W. Byrn
INVENTOR:
E. Gessner
BY Vaun
ATTORNEYS.

(No Model.) 7 Sheets—Sheet 7.
E. GESSNER.
FEEDING MECHANISM FOR CARDING MACHINES.
No. 267,513. Patented Nov. 14, 1882.
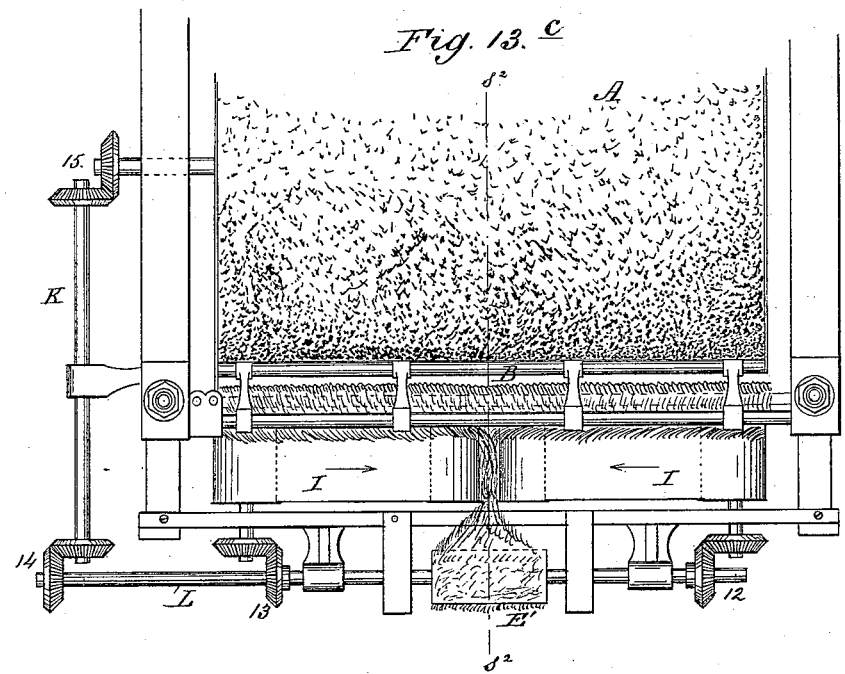
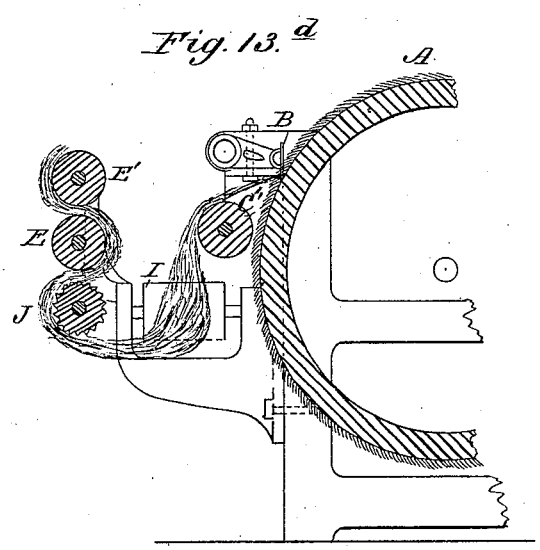
WITNESSES:
W. W. Hollingsworth
Edw. W. Byrn
INVENTOR:
E. Gessner
BY
ATTORNEYS.

UNITED STATES PATENT OFFICE.

ERNST GESSNER, OF AUE, SAXONY, GERMANY.

FEEDING MECHANISM FOR CARDING-MACHINES.

SPECIFICATION forming part of Letters Patent No. 267,513, dated November 14, 1882.

Application filed June 3, 1882. (No model.) Patented in England April 26, 1881, No. 1,791, and June 17, 1881, No. 2,660; in Belgium August 30, 1881, No 55,592, and in France September 16, 1881, No. 144,871.

*To all whom it may concern:*

Be it known that I, ERNST GESSNER, of Aue, Saxony, Germany, have invented new and Improved Feeding Mechanism for Carding-Machines; and I do hereby declare that the following is a full, clear, and exact description of the same, reference being had to the accompanying drawings, forming part of this specification.

In carding-machines where two, three, or more machines are arranged in one set, each of which works separately and independently of the other, and unlike the English or long carding-machines, where more than one are combined, a continuous even feeding from one engine to another is required in order to obtain good results. To accomplish this is the object of my invention, and by the use of my improved machine I form an even and broad flat sliver of any breadth of the material carded in one engine, and, carrying it to the next, deposit it upon the feed-table and feed it to the licker-in of that engine, forming a constant connection and transfer of wool from one machine to the other, and laying the sliver upon the feed-table of the second machine in such manner as to secure an even thickness of material from side to side of the feed-table, without ragged edges, as will be hereinafter fully described.

Figure 1 is a side elevation, and Fig. 2 a plan view, of the feed-table of the receiving-machine, showing the mechanism for laying the sliver as it comes from the preceding machine, the method of laying the same, and the means for evening the edges. In these two figures the parts in one figure are projected from the other to render the reading of the drawing easier. Figs. 3 and $3^a$ show respectively, in a series of cross-sections and a plan with lip $x$ removed, the manner of evening the irregular edges of the material laid on the feed-table. In Fig. 3 the series of sections are taken on the lines $a^2$ $b^2$ $c^2$ $d^2$ $e^2$ $f^2$ of Fig. $3^a$, the sections being placed opposite the said lines. Figs. 4 to 9 show modified means for accomplishing the evening of the edges, Figs. 4 and $4^a$ being a side and partial plan of one arrangement, Figs. 5 and $5^a$ similar views of another arrangement, Figs. 6 and $6^a$ a cross-section and a partial plan of another, Figs. 7 and $7^a$ a side and a partial plan of another, and Figs. 8 and $8^a$ a cross-section and a plan of still another, while Fig. 9 is a partial plan of another. Fig. 10 is a detail side view of the belts and rollers for transferring the sliver from one machine to the other, the left-hand part of said devices being the part which is connected with the machine from which the sliver is taken, and the right-hand portion being the part which is arranged in connection with the feed-table of the machine upon which the sliver is deposited, while the dotted lines indicate the oscillating movement of the belts when in action. Figs. 11 and 12 show a modified construction of the device illustrated in Fig. 10, showing also at Fig. 12 the delivery end of one machine, and at Fig. 11 the feed-end of the next machine. Fig. $12^a$ is a plan, and Fig. $12^b$ a side elevation, of the delivery end of the machine, shown in end view at Fig. 12. Fig. $13^a$ is a plan, and Fig. $13^b$ a side elevation, of a modified arrangement of Figs. 12, $12^a$, and $12^b$. Fig. $13^c$ is a plan, and Fig. $13^d$ a longitudinal section through line $s^2$ $s^2$ of $13^c$, showing a further modification of mechanism for taking the sliver from the delivery end of the first machine. In this modification the sliver is taken from the middle of the discharge end of the machine, instead of from the side, as in the preceding arrangement.

I will now proceed to describe more minutely my invention with reference to these drawings, commencing most appropriately at the delivery end of the first machine.

Referring to Figs. 12, $12^a$, and $12^b$, A represents the doffer at the delivery end of one of the carding-machines, from which the fleece is removed by a comb, B. This fleece passes over a drum or roller, C, Fig. 12, which supports and transfers it to an obliquely-running belt, D, Fig $12^a$, which carries it off to the side of the machine and under the roller E, which compresses the sliver, which then passes upon the transfer-belt, and is carried thereby to the feed-table of the next machine, as shown in Figs. 11 and 12.

For operating the parts so far described, a large gear-wheel, 1, is located upon the same shaft with the doffer. (See Fig. $12^b$.) This large wheel 1 drives a double gear, 2 2', (see Fig. 12ª,) which double gear turns upon a pin, a, and has two rows of teeth, one of which, 2', meshes with gear 1, and the other of which, 2, meshes with and drives gear 3. On the same shaft with gear 3, at the outer end thereof, is gear 4, which drives gear 5, which is keyed upon the shaft of roller C and turns it. Inside of gear 3, and on the same shaft therewith, is a bevel-gear, 6, meshing with and driving a bevel-gear, 7, which is keyed on the shaft of roller F, which drives the belt D. On the outer end of the shaft of roller F is fastened gear 10, Fig. 12ª, which drives gear 11, immediately above it, Fig. 12ᵇ, which gear 11 is keyed on the shaft of a roller, G, that drives the transfer-belt H, Figs 12 and 12ᵇ. For driving the compressing-roller E, a gear, 8, is arranged on the shaft of subjacent roller F, Fig. 12ª, and meshes with a gear, 9, on the shaft of roller E, as indicated by dotted lines in Fig. 12ᵇ. If desired, there may be an additional press-roller placed beside E, between which the sliver passes, and a tapering tube or mouth-piece may be employed to guide the sliver in its passage.

As a modification of the part of the device thus described, instead of arranging the roller C parallel with the doffer and the belt D at an angle, as in Figs. 12ª and 12ᵇ, I may arrange the belt D parallel and the roller C diagonal, as shown in Figs. 13ª and 13ᵇ. In both these arrangements the delivery of the sliver is at the side of the machine, and in this arrangement the same gears, 1 to 9, serve to drive the parts. As a further modification, I may use the arrangement shown in Figs. 13ᶜ and 13ᵈ, in which the fleece passes off the doffer from the action of the comb, thence over the roller C' (shown only in Fig. 13,) onto two belts, I I, arranged parallel with the longitudinal face of the doffer, and the upper surface of which belts runs toward the center and carries the sliver down in a vertical plane, thence around the feed-roller J, and thence between the pressing-rolls E E' to the transferring-belt H. (Shown in Figs. 10, 11, and 12.) For driving the belts I, a shaft, L, imparts motion to its rollers through bevel-gears 12 and 13, and this shaft derives its motion from the shaft of the doffer through counter-shaft K and bevel-gears 14 and 15.

I will now describe the devices for transferring the sliver to the feed-table of the other machine.

The carrier or transfer belt H, (see Figs. 11 and 12,) driven by roller G, passes around pulleys b b' b², carried by a lever, M, which oscillates about b' as a center. The outer end of this lever or belt frame is supported by a rope, c, passing around a pulley, c', over head, and attached to a weight, c², which balances said lever. To this end of the lever is also jointed a frame carrying pulleys d d', around which pass the two parallel belts or carriers N N', between which the sliver passes downwardly to the feed-table, the said belts being distended around driving-rollers at the bottom, near the feed-table. In Fig. 11 it will be seen that the double carrier is composed of two independent belts, N N', while in Fig. 10 the main transfer-belt H is extended to take the place of the belt N'. (Shown in Fig. 11.) In both cases, however, the sliver is held on both sides as it descends, so that it is perfectly guided and cannot fall away from its carrier as the said carrier oscillates across the feed-table of the second machine, as shown in dotted lines.

Referring to Figs. 1 and 2, O is the feed-apron of the machine, upon which the sliver is deposited by the carrier or transfer belts in diagonal layers.

P P' are the laying-rollers, around which are distended the oscillating belts of the double carrier. These laying-rollers reciprocate back and forth diagonally across the feed-apron, and have also a positive and continuous rotation for feeding the sliver down upon the table.

Q is an endless belt distended around a pulley, e, located at one end of the feed-table, and another, e', at the opposite end. On this belt is fixed a pin, f, which plays in a cup, g, attached to or formed on a cross-head, h. This cross-head slides on the rod i, and as the pin f of the belt traverses its circuit it drags the cross-head and the laying-rollers with it back and forth, the length of the cup g serving to permit the pin f to pass from one side of the belt to the other in the reverse movements of the cross-head.

To give continuous rotation to the laying-rollers P P', their shafts are extended through bearings in the cross-head h and provided with bevel-gears j j, Fig. 2, which mesh with bevel-gears k k on the shaft R. These bevel-gears k k are free to slide on the shaft R, but revolve with it by reason of a feather-and-groove connection. The shaft R being set revolving, it will be seen that it causes the gears k k to revolve irrespective of their position, as they slide on the shaft R, so that the laying-rollers are continuously rotated at all times, both throughout their range of travel and also at the ends of their travel, while the pin f is turning around the pulleys e e'.

For driving the shaft R and belt Q a main belt, S, is connected with any source of power and turns pulley S'. On the hub of this pulley is a gear-wheel, 16, Fig. 1, that meshes with an idle-pulley, 17, that is mounted on a short journal having its bearing in the frame of the machine, and through it (17) turns gear-wheel 18. This latter is keyed on a shaft, m, Fig. 2, which on the inner side of its bearing has two bevel-gears, 19 and 20. Of these bevel-gears, 20 turns a horizontal bevel-gear, 21, just beneath which is the pulley e', that gives motion to the belt Q. The other bevel-gear, 19, meshes with a bevel-gear, 22, on a short shaft, which at its outer end bears a gear-wheel, 23, that engages with 24, Fig. 1, and this turns 25, which latter is fixed on the end of the shaft R, Fig. 2, and imparts rotary motion to the same.

On the outer end of the shaft m is fixed a pulley, T, which, through a belt, T', transmits motion to a large pulley, T², (shown in dotted lines in Fig. 1,) from the hub of which pulley-belts $u'$ and $u^2$ run to rotate the press-roller $o$ and feed-rollers $p\ p$ on the feed-table, which rollers will be hereinafter referred to.

As the sliver is laid diagonally upon the feed-table, the half of two laps of the sliver overlaps the half of the two laps preceding, thus making the fleece as it lies on the table of fourfold thickness of the sliver. This uniform quadruple thickness of sliver, however, only extends to the lines $q\ q$, and whatever projects outside of this line is of uneven thickness. Thus the squares $r\ s$ are of double thickness only, while the little triangles $u$, alternating with the squares outside the line $q\ q$, are of quadruple thickness. The squares $r\ s$ are divided on each side of the machine by lines $t\ t$ into triangles, which lines are made the lines of folding, so that the triangle $r$ of double thickness may be turned over upon the triangle $s$ of double thickness, making the material outside of the line $q\ q$ of uniform quadruple thickness. This forms a perfectly straight and even edge, $t\ t$, for the material on the table, and also an exactly uniform thickness of material from edge to edge. The turning or lapping over of these triangles may be done in various ways. That which I consider the simplest and best is shown in Figs. 2, 3, and 3ª. The wool, after it is laid on the table, passes under the slowly-revolving press-roller $o$, which tends to press the slivers together into a more or less compact fleece. Each end of this roller has a peripheral groove cut in it directly in line with the folding-line $t\ t$, which bisects the squares $r\ s$ diagonally. Within these grooves are held light rods or stiff wires $v$, which at their upper ends are connected to arms $w$, attached to the frame of the feed-table, and which wires pass in the grooves in roller $o$ partially around and under the same, and trail in horizontal position over the edges of the fleece directly in line with the folding-lines $t\ t$. This wire can be made of any shape in cross-section and of any desired thickness and length; but it preferably extends to the feed-rolls $p\ p$. For the said wire a flat piece of tin may be substituted, the function of the same being simply that of a creaser to define the line of folding. Alongside of this wire, on each side, is a lip, $x$, of tin or molded casting, which turns up first, and then gradually leans over as it nears the feed-rolls $p$, and finally bends entirely over the wire $v$, as shown in Figs. 3 and 3ª. Now, it will be seen that as the sheet of wool moves along, the triangles $r$, which protrude over wire $v$, will slide against the lip $x$, which is very smoothly finished on its inner side, and be bent over and upon the triangle $s$, making a uniform quadruple thickness for the sheet of wool and straight even edges as it passes under the feed-rolls $p\ p$. The different positions of the triangles in being turned over are more clearly shown in Figs. 3 and 3ª, in which the series of sections in Fig. 3 are placed opposite the section-lines $a^2\ b^2\ c^2\ d^2\ e^2\ f^2$ in Fig. 3ª. The advantage of this method of doubling over the projecting edges to a uniform thickness and a straight line is that it avoids the sacrificing of the side rovings, which are ordinarily made into waste because of their unevenness, and secures as uniform thickness and smoothness for the edges as it does for the central parts of the fleece.

As modifications of the means for evening the edges of the fleece, I may use several different arrangements. Thus in Figs. 4 and 4ª I dispense with the stationary lip $x$ and use in the place of the same a belt, $y$, passing around pulleys, $z\ z$, set in different planes, the slats of the feed-table being elevated slightly at this point by a roller, $y^2$; or, as in Figs. 5 and 5ª, I may use the pulleys $z'\ z'$, set in the same plane, with the belt $z^2$ twisted or crossed on one side. In Figs. 6 and 6ª I leave out the press-roll $o$ and wire $v$, but preserve the stationary lip $x$, and do the creasing with a rotary disk, $y^3$, set obliquely to the vertical line. This disk may either be positively driven or be rotated by the movement of the wool-sheet.

In Figs. 7 and 7ª I use a straight lip-piece, $x'$, and do the creasing by a flat metal strip, $v'$, as in Fig. 7, or by a disk, $v^2$, as in Fig. 7ª. In Fig. 7 the straight creaser runs longitudinally on the lip, while in Fig. 7ª the rotary creaser is arranged between the lip and the feed-rolls $p$. In both these modifications, however, a horizontal disk, $v^3$, with a grooved periphery, holds the lap of wool in its turned-over position as it passes from the lip to the feed-rolls.

In Figs. 8 and 8ª is shown a hinged lap-piece, $x^2$, on each side, which two lap-pieces are connected by a rod, $x^3$, and to which an oscillating motion is imparted through a connecting-rod, $x^4$, and a crank, $x^5$. In this case the feed-table has on each side shoulders $x^6$, and the oscillation of the hinged lap-pieces serves to double over the projecting corners of the fleece immediately in front of the feed-rolls $p$, as shown.

The lapping of the slivers on the feed-table can also be made, as it is laid on the table at a more acute or more obtuse angle than that shown in the preceding figures, and the slivers laid also a great deal thicker. The more acute or obtuse the slivers are laid as compared with the angle shown in Fig. 2 the smaller the triangles $r$ will be. To even such edges as are formed by laying the sliver at a different angle or greater thickness, I employ the arrangement shown in Fig. 9. In this arrangement, the fleece being so thick, the press-roller $o$ is left out and an endless lattice-sheet, $O^2$, is used in the place thereof, which lattice-sheet runs close to the feed-rolls in order to keep the wool well pressed down. A horizontal disk, $z^5$, then crowds the projecting angles of the slivers together to a straight edge, which straight edge is preserved by a lip-piece, $z^6$, until the fleece is well under the feed-roll $p$.

In defining my invention with greater clearness, I would state that I am aware of the patent to Apperly and Clissold, of December 22, 1857, in which is shown the diagonal disposition of the ropings on the feed-belts, and in which the laying-rollers are driven by a frictional contact with a surface over which they have a progressive movement.

I am also aware of the patent to Dow, September 28, 1869, in which the laying-rollers have a positive motion by means of gear-wheels that mesh into racks, which motion is, however, like that just described, derived from the travel of the laying-rolls. My invention is distinctive with respect to the foregoing in the mode of forming and laying a flat sliver in contradistinction to a round roping, and also in that in my case the rotation of the laying-rollers is not dependent upon their engagement with a frictional surface or toothed rack in their progressive movement, but are positively and continuously rotated independent of their travel. This secures a new and important result, for when the laying-rollers depend for their rotation upon their travel, as in said patents, there is at the ends of their travel a movement at which there is no travel and no rotation, and at this time, as the wool it not positively fed, the motion of the belts forming the feed-table will drag the looped ends of the ropings away from each other and make gaps or uneven places at the edges. By making the motion of the laying-rollers independent of their travel they continue to rotate at the ends of the reciprocation, and by giving a sufficient fullness to the sliver at its bend prevents the dragging apart of the doubled ends of the sliver, and thus secure an even edge, free from gaps.

I am also aware of the patent to Wilde, April 6, 1880, which shows an intermediate or cross feeder, in which the fleece is taken from one machine, doubled up lengthwise by a diagonal belt, and carried to a transfer-belt oscillating back and forth over the feed-table of the next machine. My invention is distinctive in respect to this in the use of the press-roll E in my machine, which gives an even flat sliver of uniform thickness, without parallel folds or uneven matting of the wool, and also in the fact that in my transferring devices the sliver is, as it descends upon the second machine, held on both sides by the double belts against falling away from the carrier, and also, further, in the fact that my diagonally-laid flat slivers have their ends evened and folded to a uniform thickness and straight edge.

Having thus described my invention, what I claim as new is—

1. The method herein described of transferring and feeding the woolen fleece from one carding-machine to another, which consists in discharging said fleece from one machine in the form of a flat sliver, then disposing this flat sliver upon the feed-table of the next machine in diagonal lapped layers, then evening the edges to a straight line and uniform thickness before it passes to the feed-rolls of the cards, substantially as described.

2. The method herein described of transferring and feeding the woolen fleece from one carding-machine to another, which consists in discharging said fleece from one machine in the form of a flat sliver, then disposing the flat sliver upon the feed-table of the next machine in diagonal lapped layers to form a quadruple thickness, then turning the projecting triangles $r$ of double thickness into the triangles $s$ of double thickness, to form a straight edge and uniform thickness, substantially as described.

3. The means for turning and folding the projecting angles $r$, consisting of the combination, with the main feed-apron O, of a creaser for marking the line $tt$ and a folding mechanism for turning said angles inwardly and holding them, substantially as described.

4. The combination, with the main feed-apron, of the roller $o$, having grooves at its end, the creasing-wires $v$, or their equivalent, as described, and the folding-lips $x$, substantially as and for the purpose specified.

5. The means for carrying the sliver from one machine to the other, consisting of the movable belt-carrier, having at its vertical swinging end a traveling belt-section upon each side of the descending path of the sliver, as described, for the purpose of preventing the sliver from falling away from the belt while being laid, substantially as described.

6. The swinging belt-carrier, having at its delivery end laying-rollers, combined with means for positively and continuously rotating said laying-rollers throughout the travel and at the ends of their range of reciprocation, independently of their progressive motion, substantially as shown and described.

7. The combination, with a carding-machine, of a belt, D, press-roller E, and a roller, C, the said roller C and belt being set in angular relation to each other and applied to the rear end of said carding-machine, as and for the purpose described.

8. The combination of the belt H, presser-roll E, the belt D, and the roller C, as described.

This specification of my invention signed by me the 22d day of March, 1882.

ERNST GESSNER.

Witnesses:
E. FRITZSOBES,
A. NOEJOLD.